US008687052B2

(12) United States Patent
Ha et al.

(10) Patent No.: US 8,687,052 B2
(45) Date of Patent: Apr. 1, 2014

(54) STEREOSCOPIC IMAGE DISPLAY DEVICE, POLARIZING FILM AND PANEL AND STEREOSCOPIC IMAGE DISPLAY SYSTEM CONTAINING THE FILM AND PANEL

(75) Inventors: Hoe Jin Ha, Seoul (KR); Jung Hoi Kim, Gwangju Si (KR)

(73) Assignee: Redrover Co., Ltd., Seongnam si (KR)

( * ) Notice: Subject to any disclaimer, the term of this patent is extended or adjusted under 35 U.S.C. 154(b) by 315 days.

(21) Appl. No.: 13/061,769

(22) PCT Filed: Aug. 27, 2009

(86) PCT No.: PCT/KR2009/004774
§ 371 (c)(1),
(2), (4) Date: Mar. 9, 2011

(87) PCT Pub. No.: WO2010/027155
PCT Pub. Date: Mar. 11, 2010

(65) Prior Publication Data
US 2011/0164120 A1    Jul. 7, 2011

(30) Foreign Application Priority Data

Sep. 2, 2008 (KR) .................. 10-2008-0086362

(51) Int. Cl.
*H04N 13/04* (2006.01)
(52) U.S. Cl.
USPC .................................... 348/51; 348/42; 353/8
(58) Field of Classification Search
USPC .......................................................... 348/51
See application file for complete search history.

(56) References Cited

U.S. PATENT DOCUMENTS

| 6,069,649 | A | * | 5/2000 | Hattori | 348/51 |
| 6,703,988 | B1 | | 3/2004 | Fergason | 345/6 |
| 7,916,221 | B2 | * | 3/2011 | Daiku | 349/15 |
| 2002/0113868 | A1 | | 8/2002 | Park et al. | 348/42 |
| 2006/0268407 | A1 | | 11/2006 | Fergason et al. | 359/465 |
| 2007/0159602 | A1 | * | 7/2007 | Fergason | 353/8 |
| 2008/0297434 | A1 | * | 12/2008 | Abileah | 345/5 |

FOREIGN PATENT DOCUMENTS

| JP | 04-353818 A | 12/1992 |
| JP | 05-168046 A | 7/1993 |
| JP | 2001-042261 A | 2/2001 |

(Continued)

OTHER PUBLICATIONS

European Search Report dated Apr. 18, 2013 issued in corresponding European Application No. 09811654.4-1903 / 2334094.

(Continued)

*Primary Examiner* — Jay Patel
*Assistant Examiner* — Jessica Prince
(74) *Attorney, Agent, or Firm* — Stein IP, LLC (57) ABSTRACT

The present invention relates to a stereoscopic image display device and to a stereoscopic image display system. More particularly, the present invention relates to a stereoscopic image display device in which a polarizing film and a panel contained in a display are not separated from each other so that the color and the view angle are prevented from degrading, and relates to a stereoscopic image display system which enables a user to observe both stereoscopic images and planar images at the same time with both eyes even when the user is wearing polarizing eyeglasses.

7 Claims, 9 Drawing Sheets

(56) References Cited

FOREIGN PATENT DOCUMENTS

| | | |
|---|---|---|
| KR | 10-2000-0007389 A | 2/2000 |
| KR | 10-2002-0068629 A | 8/2002 |
| WO | WO 2006/058094 A | 1/2006 |
| JP | 2003-005130 A | 1/2003 |
| JP | 2008-191399 A | 8/2008 |

OTHER PUBLICATIONS

PCT International Search Report, mailed Aug. 27, 2008, issued in corresponding PCT Application No. PCT/KR2009/004774.

Japanese Office Action, dated Jan. 9, 2013, issued in corresponding Japanese Patent Application JP2011-525969.

* cited by examiner

STEREOSCOPIC IMAGE DISPLAY DEVICE, POLARIZING FILM AND PANEL AND STEREOSCOPIC IMAGE DISPLAY SYSTEM CONTAINING THE FILM AND PANEL

This is a National Phase Application filed under 35 USC 371 of International Application No. PCT/KR2009/004774, filed on Aug. 27, 2009, an application claiming foreign priority benefits under 35 USC 119 of Korean Application No. 10-2008-0086362, filed on Sep. 2, 2008, the content of each of which is hereby incorporated by reference in its entirety.

TECHNICAL FIELD

The present invention relates to a stereoscopic image display device and to a stereoscopic image display system, and more particularly, to a stereoscopic image display device in which a polarizing film and a panel contained in a display are not kept separate from each other so as to prevent the degradations of color and the view angle, and to a stereoscopic image display system including the stereoscopic image display device, which enables a user to observe stereoscopic images and planar images at the same time with both eyes even when the user is wearing polarizing eyeglasses.

BACKGROUND ART

Polarization type stereoscopic image display devices enable an observer to respectively view the left-eye image and the right-eye image having different polarizations with the left eye and the right eye using polarizing eyeglasses, thereby allowing the stereoscopic images to be observed.

Figure 1:
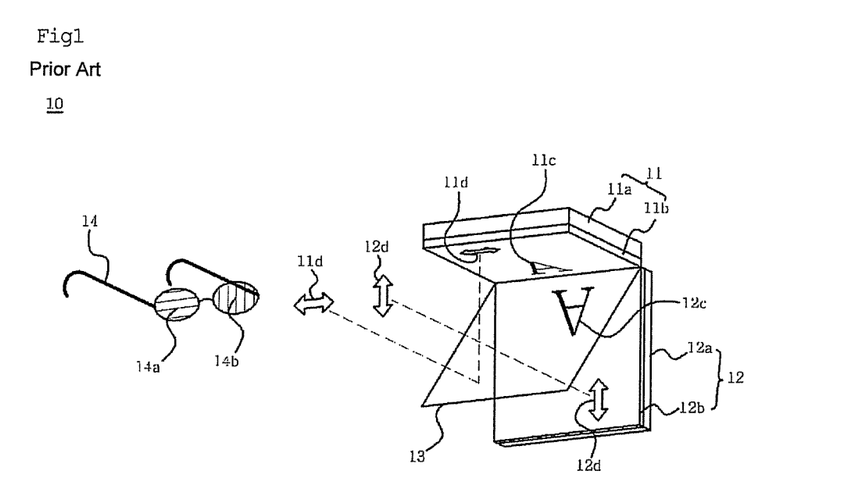
FIG. 1 shows a conventional stereoscopic image display device.
Figure 2:
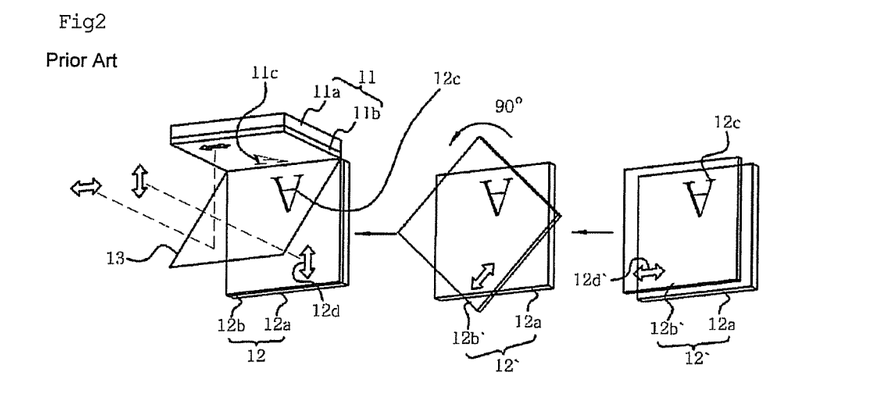
FIG. 2 shows a process of manufacturing the conventional stereoscopic image display device.

FIG. 1 shows a conventional stereoscopic image display device, and FIG. 2 shows a process of manufacturing the conventional stereoscopic image display device.

With reference to the drawings, the conventional stereoscopic image display device 10 comprises a left-eye image display 11, a right-eye image display 12, and a half mirror 13.

Also, the left-eye image display 11 and the right-eye image display 12 are installed at 90° to each other based on respective lower edges thereof, and output the left-eye image 11c and the right-eye image 12c, respectively.

Also, the displays 11, 12 respectively include polarizers 11d, 12d including panels 11a, 12a for producing the images 11c, 12c and polarizing films 11b, 12b which enable the images 11c, 12c to have predetermined polarizations 11d, 12d.

That is, the images 11c, 12c are output each having their own predetermined polarizations 11d, 12d.

Also, the half mirror 13 is installed between the displays 11, 12 forming an angle of 45° with each of the displays 11, 12, and the half mirror 13 functions to reflect the left-eye image 11c and transmit the right-eye image 12c, finally outputting the images 11c, 12c onto the front surface at the same time.

Furthermore, the polarizations 11d, 12d of the images 11c, 12c finally output by means of the half mirror 13 form 90° to each other.

Thus, when the observer is wearing the polarizing eyeglasses including polarizing filters 14a, 14b having a difference in polarizing angle of 90° to each other, he or she may view the left-eye image 11c only with the left eye and the right-eye image 12c only with the right eye, and thus the stereoscopic effect may be imparted to the user.

Meanwhile, the polarizations 11d, 12d of the images 11c, 12c may vary depending on the kind of the displays 11, 12, and the displays 11, 12 are currently manufactured so as to output the images having polarizations of 0°, 90° or 45°.

Also, the displays 11, 12 are manufactured according to different standards depending on the country, the manufacturer, or technique.

The half mirror 13 is configured such that the polarization passed through one side thereof is transmitted unchanged, and the polarization reflected from the other side thereof is converted and output.

That is, in the case where the polarization of 45° is reflected by means of the half mirror 13, the polarization of 45° is converted into a polarization of 135°.

However, in the case of the polarization of 0° or 90°, even when it is reflected and converted by means of the half mirror 13, it is mostly maintained at 0° or 90°.

This principle is to be understood that when the polarization of 0°, 90° or 45° is linearly symmetrically converted based on an imaginary vertical or horizontal line, the symmetrically converted polarizations are converted into 0°, 90° or 135°, respectively.

That is, in the case where a stereoscopic image display device is manufactured using two displays 11, 12' for outputting images having polarizations of 0°, the polarizations of the images 11c, 12c reflected or transmitted by means of the half mirror 13 are 0° identical to each other, and thus the image is not transmitted through any one polarizing filter of the polarizing eyeglasses which the user is wearing. Ultimately, the stereoscopic effect is not imparted to the user.

Hence, the case where the stereoscopic image display device is manufactured using displays having the polarizations of 0° or 90° is problematic because the polarization of any one image should be rotated by 90° and then output.

Conventionally, the polarization 12d' of any one image 12c is rotated by 90° in such a manner that the panel 12a and the polarizing film 12b of any one display 12' among the displays 11, 12 are separated from each other, after which the polarizing film 12b' is rotated by 90° and then re-attached to the panel 12a.

However, such a conventional method undesirably degrades the color or view angle of the display, and there are many technical and temporal problems that follow from the separation and re-attaching of the polarizing film 12b'.

Meanwhile, in the case where the stereoscopic image display device is manufactured using two displays (not shown) for outputting images having polarizations of 45% the polarization of the image output from any one display is converted by means of the half mirror 13 and thus has the polarization of 135°, thereby eliminating the need to separate and then re-attach the polarizing film 12'.

However, in the case where the stereoscopic image display device for simultaneously outputting the polarization of 45° and the polarization of 135° is installed at the same place along with a planar image display for outputting a planar image having the polarization of 45°, when a user is wearing the polarizing eyeglasses including polarizing filters having polarizing angles of 45° and 135°, the stereoscopic image output from the stereoscopic image display may be observed, but the planar image output from the planar image display may pass through only a single one polarizing filter of the polarizing eyeglasses and thus the user may undesirably observe the planar image only with either the left or the right eye.

Figure 7:
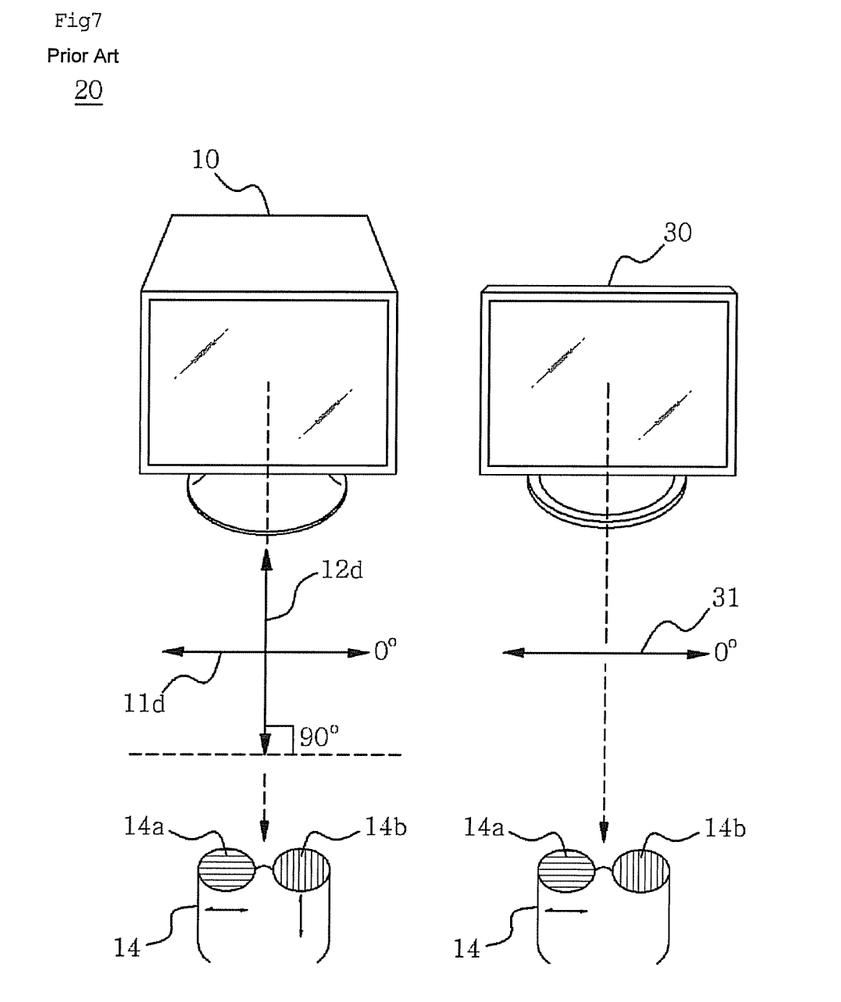
FIGS. 7 and 8 show conventional stereoscopic image display systems.
Figure 8:
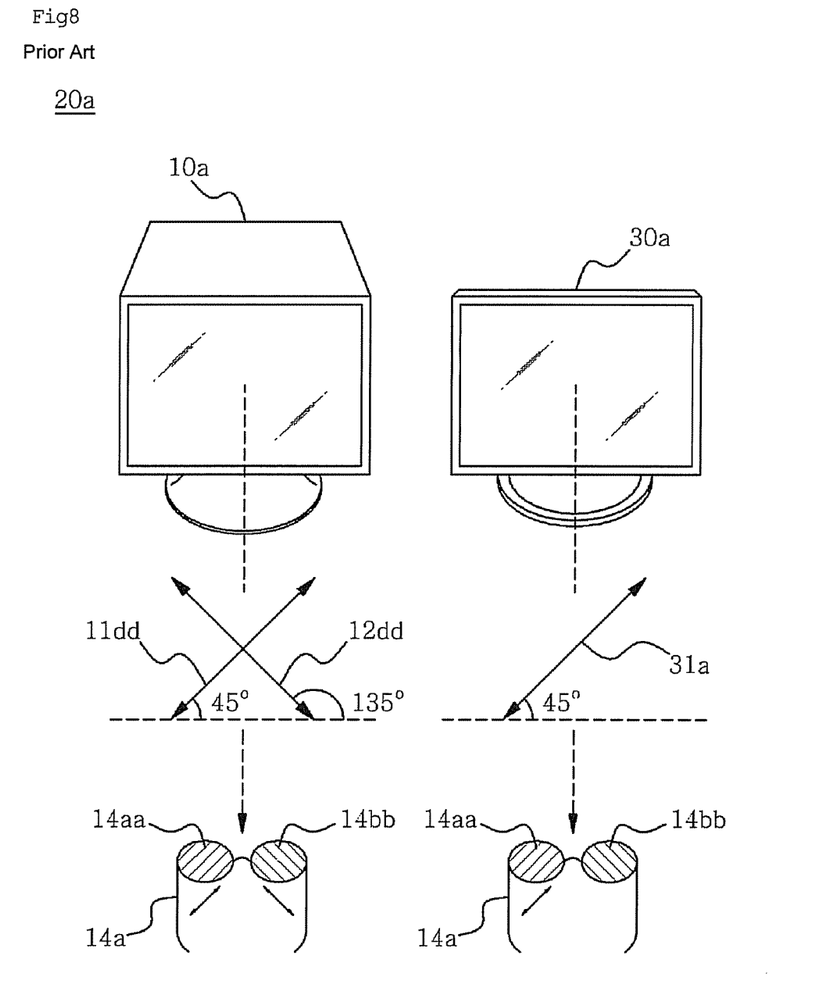

FIGS. 7 and 8 show conventional stereoscopic image display systems.

With reference to the drawings, the conventional stereoscopic image display system comprises a stereoscopic image display device 10, 10a and a planar image display device 30, 30a.

The description of the stereoscopic image display devices 10, 10a is substantially identical to that of the stereoscopic image display device as shown in FIGS. 1 and 2, and is thus omitted, and the same reference numerals are used.

The planar image display device 30, 30a outputs a planar image, in particular, a planar image having the polarization at the same angle as the polarization of the left-eye image 11c or the right-eye image 12c output from the stereoscopic image display device 10, 10a.

That is, in the case where the stereoscopic image display device 10, 10a includes a stereoscopic image display device 10 for outputting the left-eye image and the right-eye image having polarizations 11d, 12d at 0° and 90°, respectively, the planar image display device 30, 30a includes a planar image display device 30 for outputting a planar image having a polarization 31 at 0° or 90°.

Also, in the case where the stereoscopic image display device 10, 10a includes a stereoscopic image display device 10a for outputting the left-eye image and the right-eye image having polarizations 11dd, 12dd at 45° and 135°, the planar image display device 30 may include a planar image display device 30a for outputting a planar image having a polarization 31a at 45° or 135°.

The reason is that the display is manufactured according to different standards adapted for different countries, manufacturers or techniques as mentioned above.

That is, in the case where the user who is wearing the polarizing eyeglasses 14, 14a observes the images output from the stereoscopic image display device 10, 10a and then views the planar image output from the planar image display device 30, 30a, there is the problem of the planar image not being able to pass through any one polarizing filter 14b, 14bb of the polarizing eyeglasses 14, 14a.

DISCLOSURE

Technical Problem

Culminating in the present invention, intensive and thorough research into stereoscopic image display devices which do not have degraded color and view angles as well as stereoscopic image display systems which enable a user who is wearing polarizing eyeglasses to observe both the stereoscopic images and the planar images at the same time with both eyes of the user, carried out by the present inventors, resulted in the finding that a display may be manufactured without a polarizing film and a panel contained therein being separated from each other, thus preventing the degradations of color and view angle and allowing both the stereoscopic images and the planar images to be observed at the same time by both eyes of the user who is wearing polarizing eyeglasses using the polarizing film.

Thus, an object of the present invention is to provide a stereoscopic image display device, which is manufactured without the need for a polarizing film and a panel contained in a display to be separated from each other, thus preventing the degradations of color and view angle.

In addition, another aspect of the present invention is to provide a stereoscopic image display system comprising a stereoscopic image display device and a planar image display device together, in which the polarizations of images output from the stereoscopic image display device or the planar image display device are corrected, and thus the user who is wearing polarizing eyeglasses may observe the planar image with both eyes at the same time while observing the stereoscopic image.

Technical Solution

In order to accomplish the above objects, a first embodiment of the present invention provides a stereoscopic image display device, comprising a left-eye image display for outputting a left-eye image having a first initial polarization at a predetermined angle, a right-eye image display which is installed so that a front surface thereof is positioned at a predetermined angle with respect to a front surface of the left-eye image display and which outputs a right-eye image having a second initial polarization at a predetermined angle, a half mirror which is provided between the displays and transmits any one image among the images and reflects the other image so that the images are output on the same side, and a polarization corrector which is attached to the front surface of any one display among the displays and rotates the angle of the initial polarization of the image output from the attached display by a predetermined angle to produce a corrected polarization so that polarizations of the images output by the half mirror form 90° to each other.

In a preferred embodiment, the angles of the initial polarizations are respectively 0° and 0° or 90° and 90°, and the polarization corrector rotates the angle of any one initial polarization among the initial polarizations by +90° or −90° thus correcting the angle of the any one initial polarization among the initial polarizations.

In a preferred embodiment, the polarization corrector is a retardation film.

In a preferred embodiment, the retardation film is a $\lambda/2$ film, and the $\lambda/2$ film is attached with the optical axis thereof having been rotated by +45° or −45°.

In addition, a second embodiment of the present invention provides a stereoscopic image display device, comprising a left-eye image display for outputting a left-eye image having a first initial polarization at a predetermined angle, a right-eye image display which is installed so that a front surface thereof is positioned at a predetermined angle with respect to a front surface of the left-eye image display and outputs a right-eye image having a second initial polarization at a predetermined angle, a half mirror which is provided between the displays and transmits any one image among the images and reflects the other image so that the images are output on the same side, a first polarization corrector which is provided on the front surface of the left-eye image display and rotates the angle of the first initial polarization by a predetermined angle to produce a first corrected polarization, and a second polarization corrector which is provided on the front surface of the right-eye image display and rotates the angle of the second initial polarization by a predetermined angle to produce a second corrected polarization, wherein the polarization correctors respectively rotate the initial polarizations so that polarizations of the images output by the half mirror form 90° to each other.

In a preferred embodiment, the angles of the initial polarizations are respectively 0° and 0° or 90° and 90°, and the polarization correctors respectively rotate the angles of the initial polarizations by +45° or −45°.

In a preferred embodiment, the polarization correctors include a first retardation film and a second retardation film, respectively.

In a preferred embodiment, the retardation films comprises a first $\lambda/2$ film and a second $\lambda/2$ film, and the first $\lambda/2$ film and the second λ/2 film are attached with the optical axes thereof having been rotated by +22.5° or −22.5°.

In addition, a third embodiment of the present invention provides a stereoscopic image display device wherein angles of the initial polarizations output from the display device are respectively 45° and 45°, and the polarization correctors respectively rotate the initial polarizations by +45° and −45° or −45° and +45°, compared to the stereoscopic image display device according to the second embodiment.

In a preferred embodiment, the polarization correctors are a first retardation film and a second retardation film, respectively.

In a preferred embodiment, the retardation films are a first λ/2 film and a second λ/2 film, and the first λ/2 film and the second λ/2 film are attached with the optical axes thereof having been rotated by +22.5° and −22.5° or −22.5° and +22.5°, respectively.

In addition, a fourth embodiment of the present invention provides a stereoscopic image display device, comprising a left-eye image display for outputting a left-eye image having a first initial polarization at a predetermined angle, a right-eye image display which is installed so that the front surface thereof is positioned at a predetermined angle with respect to a front surface of the left-eye image display and outputs a right-eye image having a second initial polarization at a predetermined angle, a half mirror which is provided between the displays and transmits any one image among the images and reflects the other image, so that the images are output on the same side, a first circular polarization corrector which is provided on the front surface of the left-eye image display and rotates the first initial polarization in a predetermined direction to produce a first corrected circular polarization, and a second circular polarization corrector which is provided on the front surface of the right-eye image display and rotates the second initial polarization in a predetermined direction to produce a second corrected circular polarization, wherein the polarization correctors respectively rotate the initial polarizations so that polarizations of the images output by the half mirror are rotated in directions opposite to each other.

In a preferred embodiment, the angles of the initial polarizations are respectively 0° and 0°, 90° and 90° or 45° and 45°, and the circular polarization correctors rotate the initial polarizations in the same direction.

In a preferred embodiment, the circular polarization correctors include a first retardation film and a second retardation film, respectively.

In a preferred embodiment, the retardation films are respectively a first λ/4 film and a second λ/4 film, and the λ/4 films are attached with the optical axes thereof coinciding with the angles of the initial polarizations.

In addition, a fifth embodiment of the present invention provides a stereoscopic image display system, comprising a stereoscopic image display device for simultaneously outputting both a left-eye image and a right-eye image respectively having initial polarizations at predetermined angles on a front surface thereof so that the initial polarizations of the images form 90° to each other, a stereoscopic polarization corrector, which rotates the initial polarizations of the images by a predetermined angle in the same direction, so that the images respectively have corrected polarizations at predetermined angles, and polarizing eyeglasses including a left-eye polarizing filter and a right-eye polarizing filter respectively having polarizing angles identical to angles of the corrected polarizations of the images.

A preferred embodiment further comprises a planar image display device for outputting a planar image having a polarization at an angle identical to any one initial polarization among the initial polarizations, and in the preferred embodiment the left-eye image is transmitted by the left-eye polarizing filter, and the right-eye image is transmitted by the right-eye polarizing filter, and the planar image is transmitted by both the left-eye polarizing filter and the right-eye polarizing filter.

In a preferred embodiment, the angles of the initial polarizations are respectively 45° and 135° or 0° and 90°.

In a preferred embodiment, the angles of the corrected polarizations are obtained by rotating the angles of the initial polarizations by 45°, 135°, 225° or 315°.

In a preferred embodiment, the stereoscopic polarization corrector is a retardation film attached to a front surface of the stereoscopic image display device.

In a preferred embodiment, the retardation film is a λ/2 film, and the λ/2 film is attached to the front surface of the stereoscopic image display device with the optical axis thereof having been rotated by 22.5°, 67.5°, 112.5° or 157.5°.

In addition, a sixth embodiment of the present invention provides a stereoscopic image display system wherein the stereoscopic image display device has initial polarizations at 0° and 90°, and the other elements are substantially identical, compared to the stereoscopic image display system according to the fifth embodiment.

In addition, a seventh embodiment of the present invention provides a stereoscopic image display system, comprising a stereoscopic image display device for simultaneously outputting both a left-eye image and a right-eye image respectively having polarizations at predetermined angles on a front surface thereof so that the polarizations of the images form 90° to each other, a planar image display device for outputting a planar image having an initial polarization at an angle identical to any one polarization among the polarizations, a planar polarization corrector, which rotates the initial polarization of the planar image by a predetermined angle, so that the planar image has a corrected polarization at a predetermined angle, and polarizing eyeglasses including a left-eye polarizing filter and a right-eye polarizing filter respectively having polarizing angles identical to the polarizations of the left-eye image and the right-eye image.

In a preferred embodiment, the polarizations of the left-eye image and the right-eye image are respectively 45° and 135°, and the initial polarization of the planar image is 45° or 135°.

In a preferred embodiment, the polarizations of the left-eye image and the right-eye image are respectively 0° and 90°, and the initial polarization of the planar image may be 0° or 90°.

In a preferred embodiment, the angle of the corrected polarization is obtained by rotating the angle of the initial polarization by 45°, 135°, 225° or 315°.

In a preferred embodiment, the planar polarization corrector is a retardation film attached to the front surface of the planar image display device.

In a preferred embodiment, the retardation film is a λ/2 film, and the λ/2 film is attached to the front surface of the planar image display device with the optical axis thereof having been rotated by 22.5°, 67.5°, 112.5° or 157.5°.

In addition, an eighth embodiment of the present invention provides a stereoscopic image display system, comprising a stereoscopic image display device for simultaneously outputting both a left-eye image and a right-eye image respectively having polarizations at predetermined angles on a front surface thereof so that the polarizations of the images form 90° to each other, a planar image display device for outputting a planar image having an initial polarization at an angle identical to any one polarization among the polarizations, a random polarization corrector, which diffuses the initial polarization of the planar image so that the planar image has a random polarization, and polarizing eyeglasses including a left-eye polarizing filter and a right-eye polarizing filter respectively having polarizing angles identical to the polarizations of the left-eye image and the right-eye image.

In a preferred embodiment, the random polarization corrector is a diffusion film or a randomization film having frosted glass.

Advantageous Effects

According to the present invention, the following superior effects are exhibited.

Specifically, a stereoscopic image display device according to the present invention is manufactured by attaching a retardation film to the front surface of a left-eye image display or a right-eye image display without separating a polarizing film and a panel contained in a display from each other, thus preventing the color and view angle from being degraded.

Also, in the stereoscopic image display device according to the present invention, in the case where the polarization of the image transmitted or reflected by a half mirror is 0° or 90°, the efficiency of light transmission can be greatly increased using a polarizing beam splitter.

Also, in a stereoscopic image display system according to the present invention, the polarizations of images output from the stereoscopic image display device or the planar image display device are corrected using a retardation film or a randomization film under conditions in which both the stereoscopic image display device and the planar image display device are provided together, and thereby a user who is wearing polarizing eyeglasses can observe the planar image with both eyes at the same time that the stereoscopic image is being observed.

DESCRIPTION OF DRAWINGS

Throughout the drawings made according to the present invention, the elements having the substantially identical configurations and functions are designated by the same reference numerals.

DESCRIPTION OF THE REFERENCE NUMERALS IN THE DRAWINGS 100, 200, 300, 400, 510: stereoscopic image display device
110: left-eye image display
120: right-eye image display
130: half mirror
140: polarization corrector
210: second polarization corrector
500, 600, 700, 800: stereoscopic image display system
520: planar image display device
530: stereoscopic polarization corrector
710: planar polarization corrector
810: random polarization corrector

BEST MODE

As the terms used in the present invention, those terms that are typically used and are currently the most widely available have been adopted. However, in specific cases the terms are optionally furnished by the applicant, and these terms should be understood in light of the meanings given in the description or as used in the detailed description of the present invention, instead of depending on the definitions of such terms.

Hereinafter, preferred embodiments of the present invention are described in detail with reference to the accompanying drawings.

However, the present invention is not limited to the above embodiments, and may be embodied in other forms. Throughout the description, the same reference numerals indicate the same elements.

First Embodiment

Figure 3:
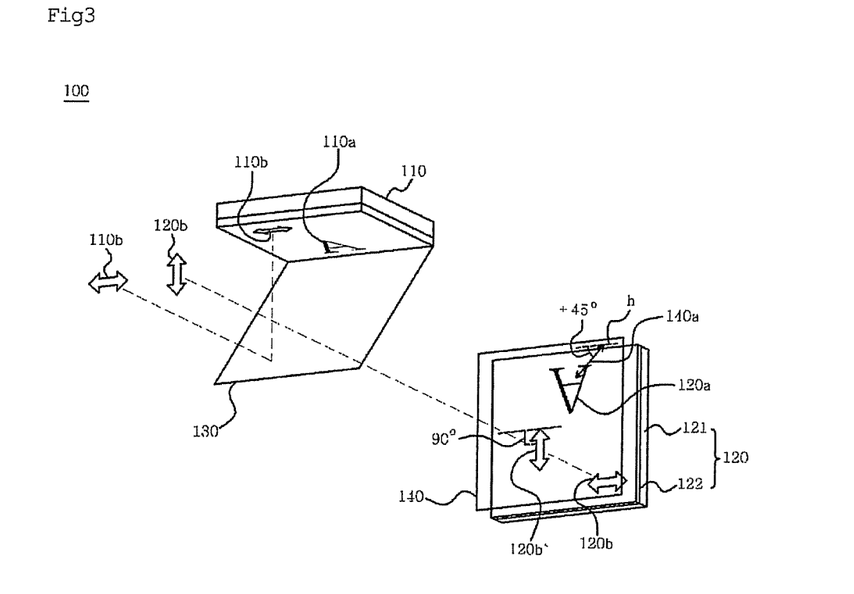
FIG. 3 shows a stereoscopic image display device according to a first embodiment of the present invention.

FIG. 3 shows a stereoscopic image display device according to a first embodiment of the present invention.

With reference to FIG. 3, the stereoscopic image display device 100 according to the first embodiment of the present invention comprises a left-eye image display 110, a right-eye image display 120, a half mirror 130, and a polarization corrector 140.

The left-eye image display 110 outputs a left-eye image 110a having a first initial polarization 110b at a predetermined angle.

Also, the left-eye image display 110 includes an LCD display which enables the output image to be polarized. However, the left-eye image display 110 may include any kind of display as long as the output image has polarization.

The right-eye image display 120 is installed so that the front surface thereof is positioned at a predetermined angle with respect to the front surface of the left-eye image display 110, and outputs a right-eye image 120a having a second initial polarization 120b at a predetermined angle.

More specifically, the right-eye image display 120 is installed at an angle of 90° with respect to the left-eye image display 110.

However, the displays 110, 120 may be installed at an angle ranging from 90° to 150° with respect to each other, and the output direction or the output magnitude of the images 110a, 120a that are finally output by means of the half mirror 130 which will be described later may be determined depending on the angle of installation.

The right-eye image display 120 includes an LCD display. However, the right-eye image display 120 may include any kind of display as long as it may output an image having polarization, like the left-eye image display 110.

Also, the images 110a, 120a output from the displays 110, 120 have initial polarizations 110b, 120b at the identical angles, respectively.

For example, the initial polarizations 110b, 120b may be 0° and 0° or 90° and 90°. That is, the displays 110, 120 may be the same kind of displays.

The initial polarizations 110b, 120b are linear polarizations which vibrate at predetermined angles based on a horizontal line (h).

The left-eye image 110a and the right-eye image 120a are output in the form of images having a predetermined disparity, and enable a user to be aware of the stereoscopic effect when the user is viewing only the left-eye image 110a with the left eye and only the right-eye image 120a with the right eye.

The half mirror 130 is provided between the displays 110, 120, and plays a part in the transmission of any one image 120a among the images and reflecting the other image 110a, so that the images 110a, 120a output from the displays 110, 120 are output on the same side.

Also, the half mirror 130 is referred to as a beam splitter, in which light incident on one side thereof is transmitted and light incident on the other side thereof is reflected.

Furthermore, the beam splitter is preferably a polarizing beam splitter (PBS) in which all of the transmitted images are transmitted and all of the reflected images are reflected when the polarization of the incident image is 0° or 90°.

Thus, the transmission and reflection efficiency of light may be advantageously increased.

Meanwhile, the PBS is undesirably thick. According to the first embodiment of the present invention, the PBS includes a wire grid polarizer (WGP) so that the thickness of the half mirror 130 may be as thin as the thickness of a typical beam splitter.

Furthermore, the half mirror 130 bisects the angle defined by the displays 110, 120 and is provided between the displays 110, 120.

Thus, in the embodiment of the present invention, the half mirror 130 is installed at 45° from each of the displays 110, 120. However, the angle at which the half mirror 130 is installed may vary depending on the angle at which the displays 110, 120 are installed.

That is, the half mirror 130 enables the user to observe the images 110a, 120a on the same side.

The polarization corrector 140 is attached to the front surface of any one display 120 among the displays 110, 120, and the angle of the initial polarization 120b of the image output from the attached display is rotated by a predetermined angle, thus obtaining a corrected polarization 120b'.

In the embodiment of the present invention, the polarization corrector 140 is attached to the front surface of the right-eye image display 120, so that the second initial polarization 120b is rotated by a predetermined angle, and thus the right-eye image 120a is imparted with the corrected polarization 120b' at a predetermined angle.

However, the polarization corrector 140 may be attached to the front surface of the left-eye image display 110 so that the first initial polarization 110b is rotated by a predetermined angle.

Also, the polarization corrector 140 functions to correct the second initial polarization 120b into the corrected polarization 120b' so that the polarizations 110b, 120b' of the images 110a, 120a output by means of the half mirror 130 form 90° to each other.

That is, the polarization corrector 140 may be attached to any display among the displays 110, 120 if the polarizations 110b, 120b' of the images 110a, 120a output by means of the half mirror 130 may form 90° to each other.

Also, the polarization corrector 140 includes a retardation film, and more specifically the retardation film includes a λ/2 film.

The λ/2 film is attached to the front surface of the right-eye image display 120 with its optical axis 140a having been rotated by +45° or −45°, and the angle of the second initial polarization 120b is rotated by +90° or −90°.

That is, when the angles of the initial polarizations 110b, 120b are 0° and 0° or 90° and 90°, the polarizations 110b, 120b finally output from the half mirror 130 by means of the polarization corrector 140 are respectively output at 0° and 90° or 90° and 0°.

Thus, the stereoscopic image display device according to the present invention can be manufactured without separating the panel 121 and the polarizing film 122 from each other, compared to the conventional stereoscopic image display device 10, thereby preventing the color and view angle of the display device from being degraded.

MODE FOR INVENTION

Second Embodiment

Figure 4:
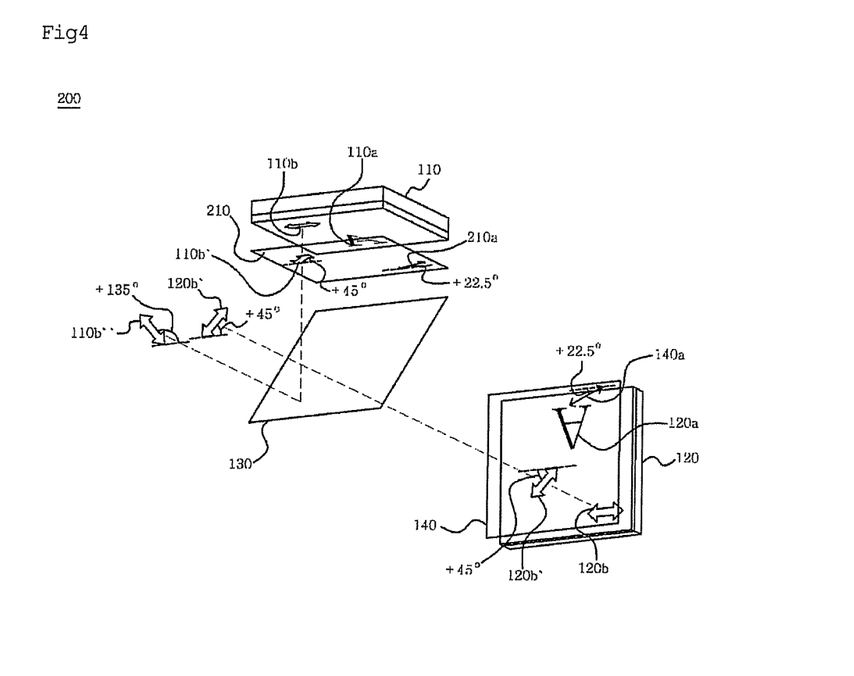
FIG. 4 shows a stereoscopic image display device according to a second embodiment of the present invention.

FIG. 4 shows a stereoscopic image display device according to a second embodiment of the present invention.

Below, the descriptions of the elements which are substantially identical to those of the stereoscopic image display device according to the first embodiment of the present invention have been omitted, and the same reference numerals are used throughout.

With reference to FIG. 4, the stereoscopic image display device 200 according to the second embodiment of the present invention comprises a left-eye image display 110, a right-eye image display 120, a half mirror 130, a first polarization corrector 140, and a second polarization corrector 210.

That is, two first and second polarization correctors 140, 210 are provided, in lieu of the polarization corrector 140 compared to the stereoscopic image display device 100 according to the first embodiment of the present invention.

Also, the first polarization corrector 140 functions to rotate the second initial polarization 120b of the right-eye image 120a by a predetermined angle so that the right-eye image 120b has a second corrected polarization 120b' at a predetermined angle, and is substantially identical to the polarization corrector 140 of the stereoscopic image display device 200 according to the first embodiment of the present invention.

The second polarization corrector 210 is attached to the front surface of the left-eye image display 110, so that the first initial polarization 110b of the left-eye image 110a output from the left-eye image display 110 is rotated by a predetermined angle, and thus the left-eye image 110a is imparted with a first corrected polarization 120b' at a predetermined angle.

Also, the second polarization corrector 210 functions to rotate the first initial polarization 110b into the first corrected polarization 110b' so that the polarizations 110b, 120b' of the images 110a, 120a output by means of the half mirror 130 form 90° to each other.

That is, the second polarization corrector 210 functions to rotate the first initial polarization 110b into the first corrected polarization 110b' so that the first corrected polarization 110b" reflected by the half mirror 130 and the second corrected polarization 120' transmitted by the half mirror 130 are output at 90° to each other.

Furthermore, the second polarization corrector 210 includes a retardation film, and more specifically, the retardation film includes a λ/2 film.

The λ/2 film is attached to the front surface of the left-eye image display 110 with the optical axis 210a thereof having been rotated by +22.5° or −22.5°, and the angle of the first initial polarization 110b is rotated by +45° or −45°.

Also, the first polarization corrector 140 is attached to the front surface of the right-eye image display 120 with its optical axis 140a having been rotated by +22.5° or −22.5°, and the angle of the second initial polarization 120b is rotated by +45° or −45°.

That is, the polarization correctors 140, 210 function to rotate the initial polarizations 110b, 120b by 45° or −45° in the same direction, so that the left-eye image 110a and the right-eye image 120a are imparted with corrected polarizations 120b', 110b' having the same angle of 45° or 135°.

Hence, the first corrected polarization 110b' of the left-eye image 110a is reflected by the half mirror 130. When the angle of the first corrected polarization 110b' is 45°, it is converted into 135°. When this angle is 135°, it is converted into 45°. Accordingly, the first corrected polarization 110b" and the second corrected polarization 120b' output by the half mirror 130 are respectively output at 45° and 135° or 135° and 45°, namely, are output at 90° to each other.

In the second embodiment of the present invention, the half mirror 130 includes a typical beam splitter.

The reason is that the PBS used in the first embodiment of the present invention may be applied only when the polarization of the incident or reflected image is 0° or 90°.

Third Embodiment

Figure 5:
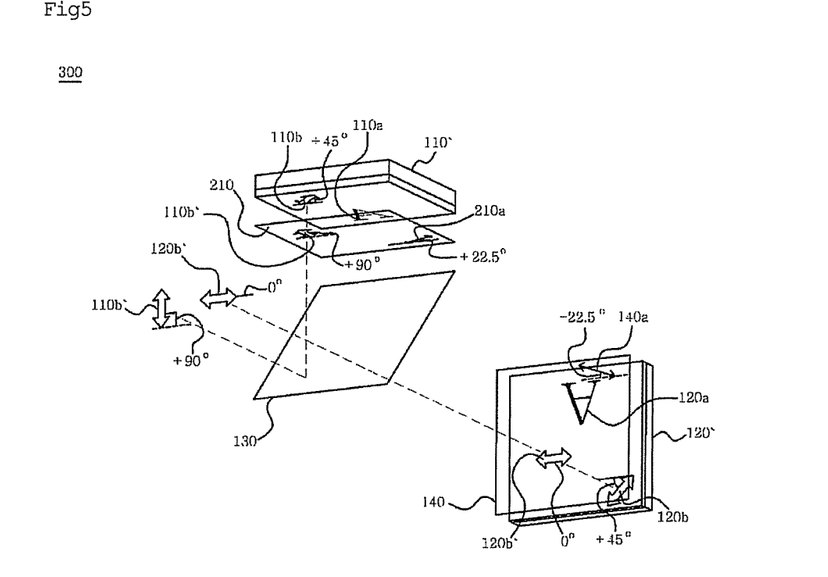
FIG. 5 shows a stereoscopic image display device according to a third embodiment of the present invention.

FIG. 5 shows a stereoscopic image display device according to a third embodiment of the present invention.

Below, the descriptions of the elements which are substantially identical to those of the stereoscopic image display device according to the second embodiment of the present invention have been omitted, and the same reference numerals are used throughout.

With reference to FIG. 5, the stereoscopic image display device 300 according to the third embodiment of the present invention includes displays 110', 120' for outputting images 110a, 120a having initial polarizations 110b, 120b at 45°, in lieu of the displays 110, 120 compared to the stereoscopic image display device 300 according to the second embodiment of the present invention.

That is, the polarization correctors 140, 210 function to respectively rotate the initial polarizations 110b, 120b at 45° by +45° and −45° or −45° and +45° to thus correct them into images that have corrected polarizations 110b', 120b' at 90° and 0° or 0° and 90°, respectively, and thereby the polarizations of the images output finally from the half mirror 130 are respectively output at 90° and 0° or 0° and 90°, namely, are output at 90° to each other.

The half mirror 130 includes a PBS as in the first embodiment of the present invention.

Thus, the transmission and reflection efficiency of light may be advantageously increased.

Meanwhile, the PBS is undesirably thick, and in the first embodiment of the present invention, the PBS includes a WGP so that the thickness of the half mirror 130 is as thin as the thickness of a typical beam splitter.

Four Embodiment

Figure 6:
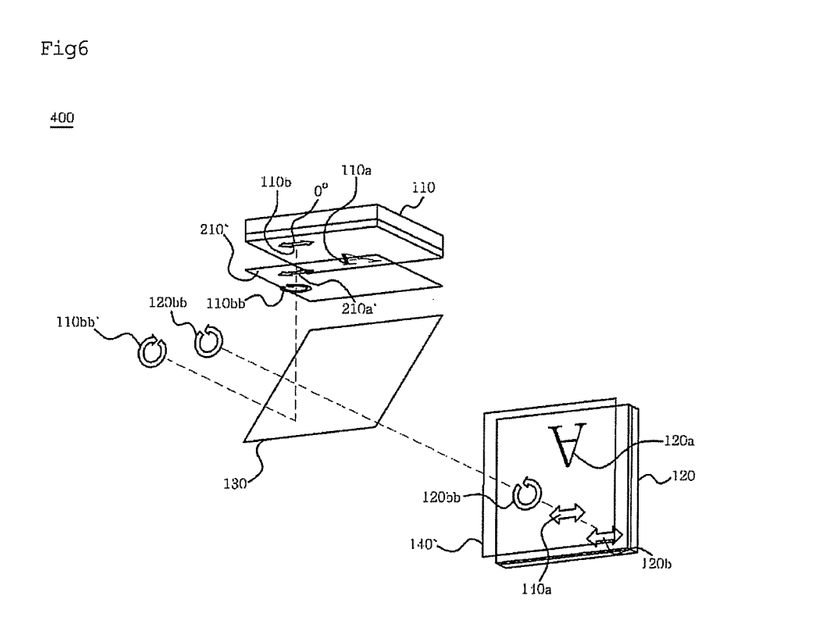
FIG. 6 shows a stereoscopic image display device according to a fourth embodiment of the present invention.

FIG. 6 shows a stereoscopic image display device according to a fourth embodiment of the present invention.

Below, the descriptions of the elements which are substantially identical to those of the stereoscopic image display device according to the second embodiment of the present invention have been omitted, and the same reference numerals are used throughout.

With reference to FIG. 6, the stereoscopic image display device 400 according to the fourth embodiment of the present invention includes circular polarization correctors 210', 140' which function to rotate the initial polarizations 110b, 120b of the left-eye image 110a and the right-eye image 110b in the same direction so that they are respectively corrected into corrected circular polarizations 110bb, 120bb that rotate, in place of the polarization correctors 210, 140 compared to the stereoscopic image display device 200 according to the second embodiment of the present invention.

Also, the angles of the initial polarizations 110b, 120b are respectively 0° and 0°, 90° and 90°, or 45° and 45°.

However, the angles of the initial polarizations 110b, 120b are deemed satisfactory as long as they are the same as each other.

Also, the circular polarization correctors 210', 140' comprise a first circular polarization corrector 210' attached to the front surface of the left-eye image display 110 and a second circular polarization corrector 140' attached to the front surface of the right-eye image display 120.

Also, the circular polarization correctors 210', 140' respectively include a first retardation film and a second retardation film, and more specifically, these retardation films includes a first λ/4 film and a second λ/4 film, respectively.

Also, the λ/4 films 210', 140' are attached so that the optical axes 210a', 140a' respectively coincide with the angles of the initial polarizations 110b, 120b.

That is, the circular polarization correctors 210', 140' function to correct the initial polarizations 110b, 120b into corrected circular polarizations 110bb, 120bb that rotate in the same direction.

For example, in the case where the initial polarizations 110b, 120b of the images 110a, 120a are respectively corrected into corrected circular polarizations 110bb, 120bb that rotate in a counterclockwise direction by means of the circular polarization correctors 210', 140', the corrected circular polarization 120bb of the right-eye image 120a is transmitted through the half mirror 130 and thus rotates in the counterclockwise direction without being changed, and the corrected circular polarization 110bb of the left-eye image 110a is reflected by the half mirror 130 and reversed in a clockwise direction, and finally the stereoscopic image display device 400 outputs the images 110a, 120a the polarizations of which have been rotated in directions opposite to each other.

Thus, when the observer is wearing polarizing eyeglasses including circular polarization filters that rotate in different directions, he or she may view the left-eye image 110a with the left eye and the right-eye image 110b with the right eye, thereby allowing the stereoscopic image to be observed.

Fifth Embodiment

Figure 9:
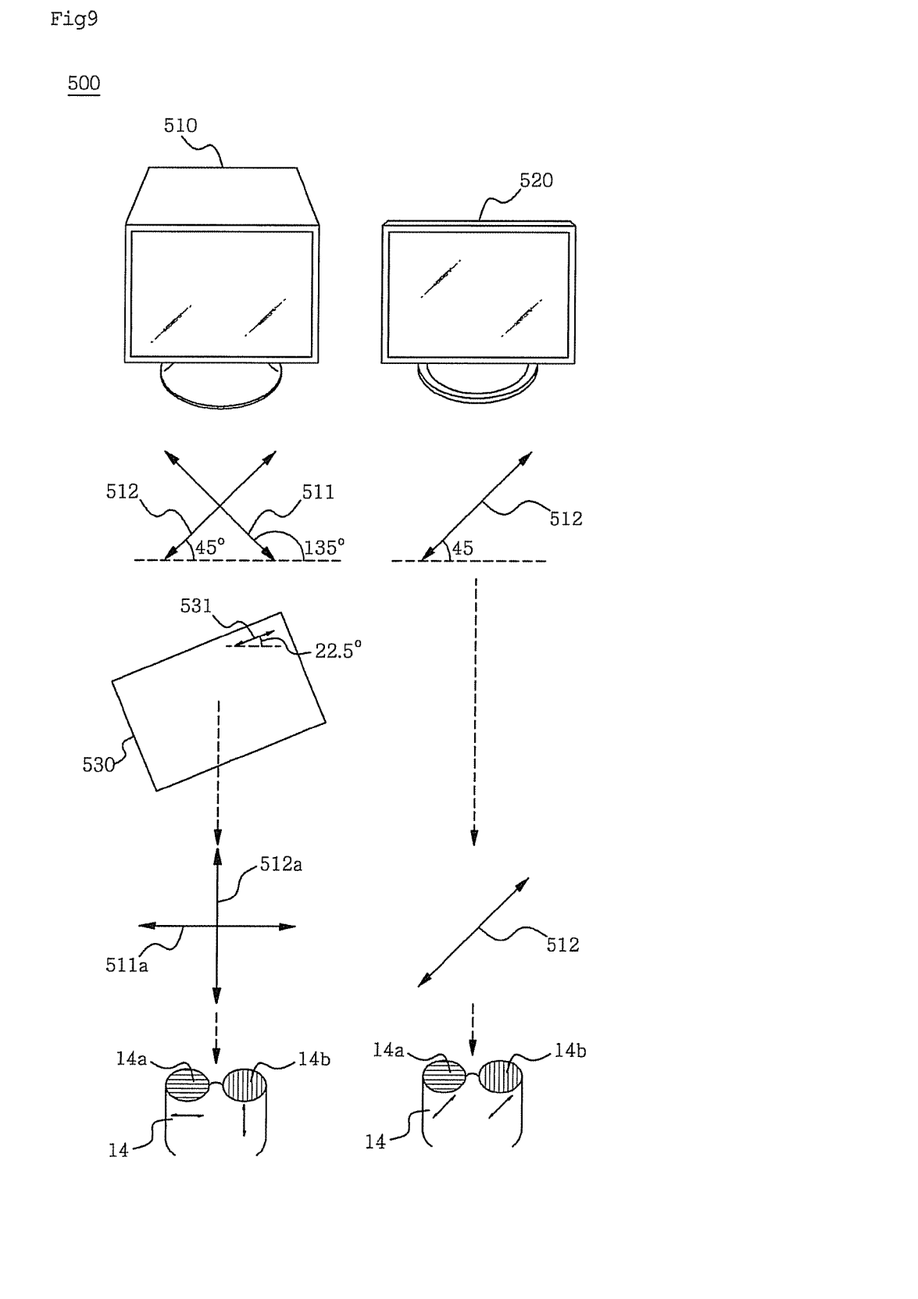
FIG. 9 shows a stereoscopic image display system according to a fifth embodiment of the present invention.

FIG. 9 shows a stereoscopic image display system according to a fifth embodiment of the present invention.

With reference to FIG. 9, the stereoscopic image display system 500 according to the fifth embodiment of the present invention comprises a stereoscopic image display device 510, a stereoscopic polarization corrector 530, polarizing eyeglasses 14, and a planar image display device 520.

The stereoscopic image display device 510 simultaneously outputs both the left-eye image and the right-eye image respectively having initial polarizations 511, 512 at predetermined angles on the front surface thereof, so that the initial polarizations 511, 512 form 90° to each other.

Also in the embodiment of the present invention, the angles of the initial polarizations 511, 512 output from the stereoscopic image display device 510 are 45° and 135°, respectively.

However, the angles of the initial polarizations 511, 512 are deemed satisfactory as long as they form 90° to each other.

The stereoscopic polarization corrector 530 functions to rotate the initial polarizations 511, 512 of respective images in the same direction by a predetermined angle, and thus respective images are imparted with corrected polarizations 511a, 512a at predetermined angles.

Also in the embodiment of the present invention, the stereoscopic polarization corrector 530 function to rotate the initial polarizations 511, 512 by 45°, 135°, 225° or 315°, so that the initial polarizations 511, 512 are respectively produced into the corrected polarizations 511a, 512a at 0° and 90° or 90° and 0°.

Furthermore, the stereoscopic polarization corrector 530 includes a retardation film attached to the front surface of the stereoscopic image display device 510, and more specifically the retardation film includes a λ/2 film.

Also, the λ/2 film is attached to the front surface of the stereoscopic image display device with the optical axis 531 of the λ/2 film having been rotated by 22.5°, 67.5°, 112.5° or 157.5°, in order to rotate the angles of the initial polarizations 511, 512 by 45°, 135°, 225° or 315°.

The polarizing eyeglasses 14 include a left-eye polarizing filter 14a and a right-eye polarizing filter 14b respectively having the same polarizing angles as the corrected polarizations 511a, 512a of the images, and the left-eye polarizing filter 14a functions to transmit only the left-eye image, and the right-eye polarizing filter 14b functions to transmit only the right-eye image.

That is, the polarizing eyeglasses 14 cause the observer to observe only the left-eye image with the left eye and to observe only the right-eye image with the right eye, thereby allowing the stereoscopic image to be observed.

The planar image display device 520 outputs the planar image having the polarization 521 at the same angle as any one initial polarization 512 among the initial polarizations 511, 512 of the stereoscopic image display device 510. That is, the planar image display device 520 outputs the planar image having the polarization 521 at 45° or 135°.

Thus, the difference in the angle of polarization 521 of the planar image is 45° from each of the corrected polarizations 511a, 512a, and there is also a difference in angle of 45° from each of the polarized angles of the polarizing filters 14a, 14b of the polarizing eyeglasses 14.

Thus, the planar image is simultaneously transmitted through the left-eye polarizing filter 14a and the right-eye polarizing filter 14b.

The polarizing filters 14a, 14b function to transmit the image only when the angle of the polarization of the incident image is not orthogonal to the polarizing angles of the polarizing filters 14a, 14b.

More specifically, when the polarizing angles of the polarizing filters 14a, 14b are orthogonal to the angle of the polarization of the incident image, the incident image is not transmitted at all. In the case where they coincide with the angle of the polarization of the incident image, the image is transmitted completely. When they are 45° to the angle of the polarization of the incident image, the image is transmitted at half brightness.

That is, the user may observe the stereoscopic image output from the stereoscopic image display device 510 even when wearing the polarizing eyeglasses 14, and also may observe the planar image output from the planar image display device 520 with both eyes.

Sixth Embodiment

Figure 10:
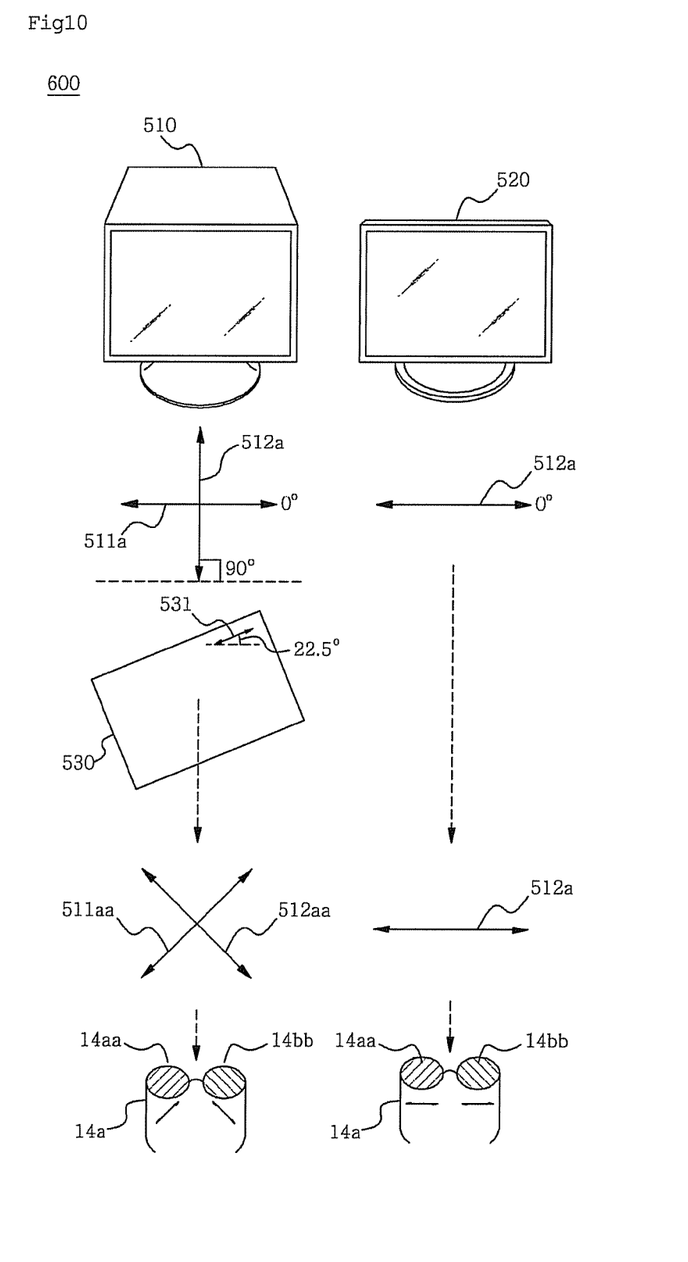
FIG. 10 shows a stereoscopic image display system according to a sixth embodiment of the present invention.

FIG. 10 shows a stereoscopic image display system according to a sixth embodiment of the present invention.

Below, the descriptions of the elements which are substantially identical to those of the stereoscopic image display system according to the fifth embodiment of the present invention have been omitted, and the same reference numerals are used throughout.

With reference to FIG. 10, the stereoscopic image display system 600 according to the sixth embodiment of the present invention comprises a stereoscopic image display device 510, a stereoscopic polarization corrector 530, polarizing eyeglasses 14a, and a planar image display device 520.

Also in the stereoscopic image display system 600 according to the sixth embodiment of the present invention, the initial polarizations 511a, 512a of the left-eye image and the right-eye image output from the stereoscopic image display device 510 are output into images at 0° and 90°, and the planar image output from the planar image display device 520 is output with a polarization 521a at 0°.

However, the angle of the polarization 521a of the planar image may be 90°, and is satisfactory as long as it is the same as the angle of any one initial polarization among the initial polarizations 511a, 512a of the left-eye image and the right-eye image.

Also, the polarizing angles of the polarizing filters 14aa, 14bb of the polarizing eyeglasses 14a are 0° and 90°, respectively.

Thus, the user who is wearing the polarizing eyeglasses 14a can observe the left-eye image and the right-eye image with the left eye and the right eye, respectively, and simultaneously can observe the planar image with both eyes.

Seventh Embodiment

Figure 11:
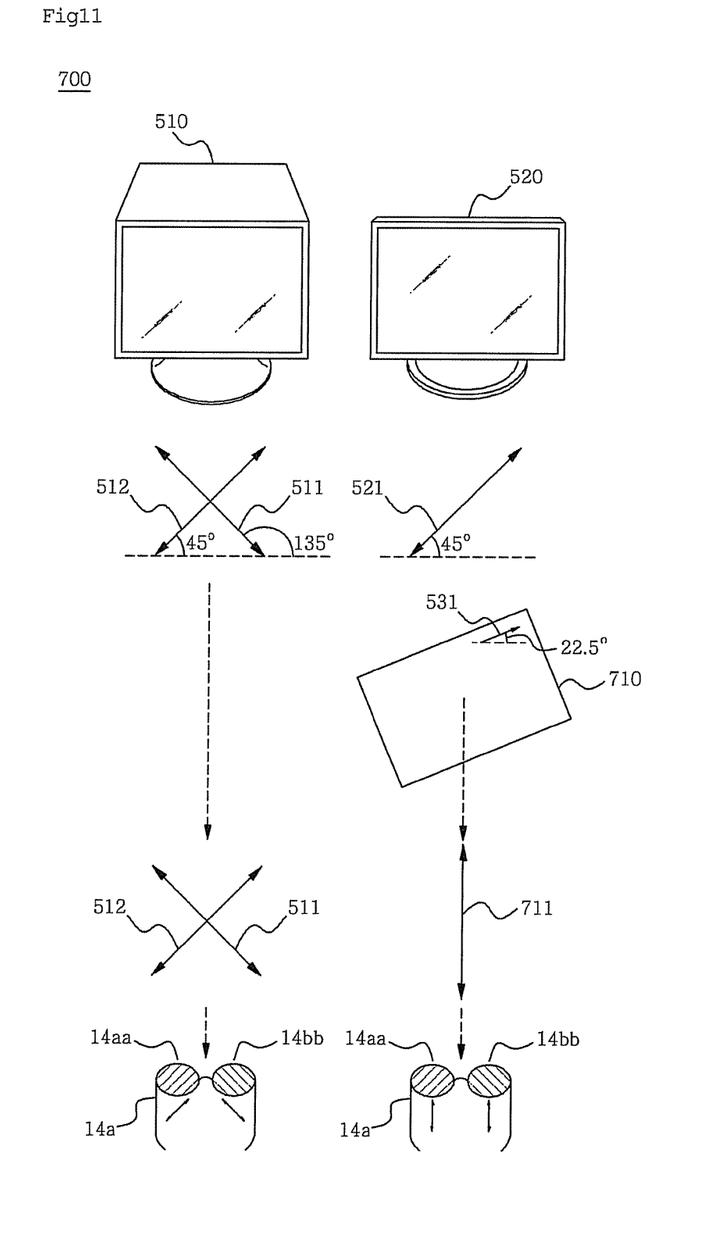
FIG. 11 shows a stereoscopic image display system according to a seventh embodiment of the present invention.

FIG. 11 shows a stereoscopic image display system according to a seventh embodiment of the present invention.

Below, the descriptions of the elements which are substantially identical to those of the stereoscopic image display systems 500, 600 according to the fifth and sixth embodiments of the present invention have been omitted, and the same reference numerals are used throughout.

With reference to FIG. 11, the stereoscopic image display system 700 according to the seventh embodiment of the present invention comprises a stereoscopic image display device 510, a planar polarization corrector 710, polarizing eyeglasses 14a, and a planar image display device 520.

Also the stereoscopic image display system 700 according to the seventh embodiment of the present invention comprises the planar polarization corrector 710 for correcting the initial polarization 521 of the planar image display device 520, in lieu of the stereoscopic polarization corrector 530 for correcting the polarizations 511, 512 of the stereoscopic image display device 510 compared to the stereoscopic image display systems 500, 600 according to the fifth and sixth embodiments of the present invention.

Also the planar polarization corrector 710 rotates the initial polarization 521 of the planar image output from the planar image display device 520 by 45°, 135°, 225° or 315°, so that the planar image has a corrected polarization 711 having a difference in angle of 45° from each of the polarizations 511, 512 of the left-eye image and the right-eye image output from the stereoscopic image display device 510.

Also, the polarizing eyeglasses 14a include polarizing filters 14aa, 14bb having the same polarizing angles as the polarizations 511, 512 of the images output from the stereoscopic image display device 510.

That is, the stereoscopic image display system 700 according to the seventh embodiment of the present invention is configured such that the stereoscopic polarization corrector 530 is attached to the front surface of the planar image display device 520 to correct the initial polarization 521 of the planar image, compared to the stereoscopic image display systems 500, 600 according to the fifth and sixth embodiments of the present invention.

Eighth Embodiment

Figure 12:
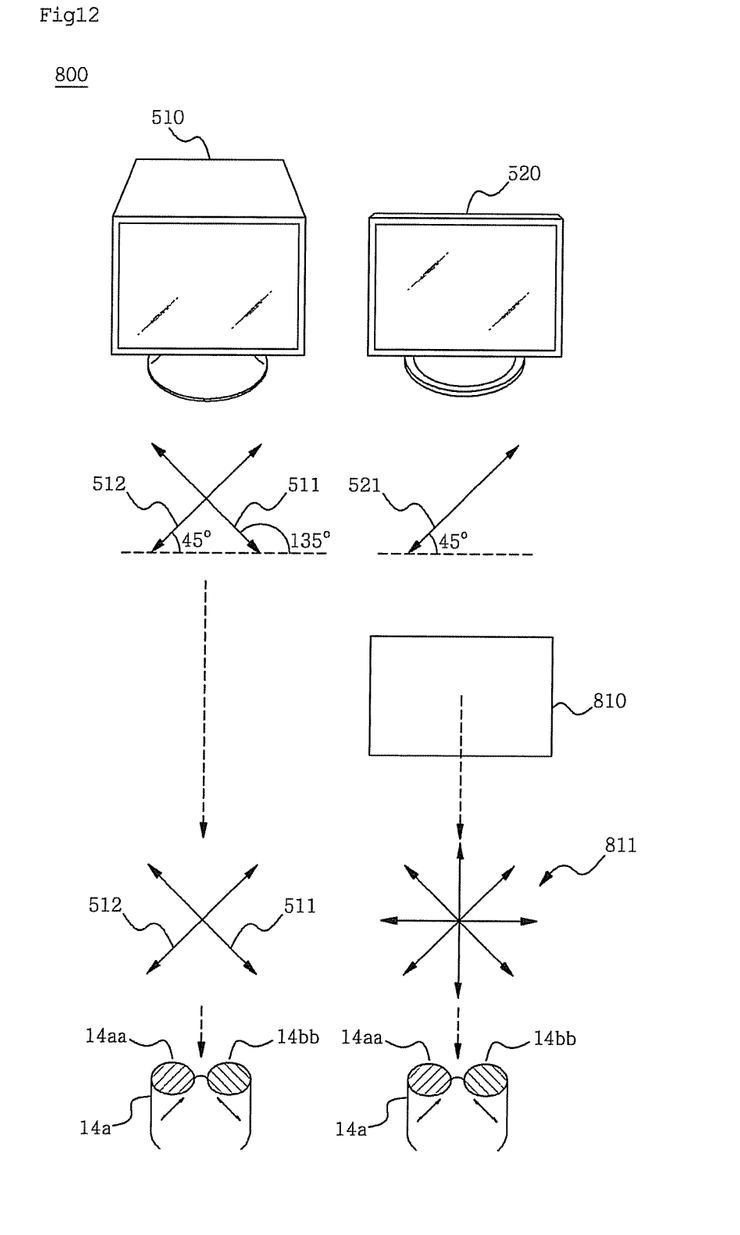
FIG. 12 shows a stereoscopic image display system according to an eighth embodiment of the present invention.

FIG. 12 shows a stereoscopic image display system according to an eighth embodiment of the present invention.

Below, the descriptions of the elements which are substantially identical to those of the stereoscopic image display system 700 according to the seventh embodiment of the present invention have been omitted, and the same reference numerals are used throughout.

With reference to FIG. 12, the stereoscopic image display system 800 according to the eighth embodiment of the present invention comprises a stereoscopic image display device 510, a random polarization corrector 810, polarizing eyeglasses 14a, and a planar image display device 520.

The stereoscopic image display system 800 according to the eighth embodiment of the present invention includes the random polarization corrector 810, in lieu of the planar polarization corrector 710 compared to the stereoscopic image display system 700 according to the seventh embodiment of the present invention.

The random polarization corrector 810 functions to diffuse the initial polarization 521 of the planar image output from the planar image display device 520 so that the initial polarization 521 of the planar image is corrected not into one polarization but into a plurality of random polarizations 811.

That is, the random polarization corrector 810 diffuses the linear polarization having a predetermined angle so that it is corrected into linear polarizations 811 having random angles, in lieu of rotating the linear polarization having a predetermined angle so that it is corrected into a linear polarization having the different angle.

The random polarization corrector 810 includes a diffusion film or a randomization film having frost glass.

Thus, regardless of the polarizing angles of the polarizing filters 14aa, 14bb of the polarizing eyeglasses 14a, the planar image may pass through all of the polarizing filters 14aa, 14bb of the polarizing eyeglasses 14a.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

According to embodiments of the present invention, the stereoscopic image display device and the stereoscopic image display system can be used under conditions in which all and any polarization type stereoscopic image display devices using the polarizing eyeglasses or both polarization type stereoscopic image displays and planar image displays are provided.

The invention claimed is:

1. A stereoscopic image display device, comprising:
   a left-eye image display for outputting a left-eye image having a first initial polarization at a predetermined angle;
   a right-eye image display which is installed so that a front surface thereof is positioned at a predetermined angle with respect to a front surface of the left-eye image display and which outputs a right-eye image having a second initial polarization at a predetermined angle;
   a half mirror which is provided between the displays and transmits any one image among the images and reflects the other image, so that the images are output on a same side;
   a first polarization corrector which is provided on the front surface of the left-eye image display and rotates the angle of the first initial polarization by a predetermined angle to produce a first corrected polarization; and
   a second polarization corrector which is provided on the front surface of the right-eye image display and rotates the angle of the second initial polarization by a predetermined angle to produce a second corrected polarization,
   wherein the polarization correctors respectively rotate the initial polarizations so that polarizations of the images output by the half mirror form 90° to each other,
   the polarization correctors are a first retardation film and a second retardation film, respectively, and
   the retardation films comprises a first $\lambda/2$ film and a second $\lambda/2$ film, respectively, and the first $\lambda/2$ film and the second $\lambda/2$ film are attached with optical axes thereof having been rotated by +22.5° or −22.5°.

2. The stereoscopic image display device of claim 1, wherein the angles of the initial polarizations are respectively 0° and 0° or 90° and 90°, and the polarization correctors respectively rotate the angles of the initial polarizations by +45° or −45°.

3. The stereoscopic image display device of claim 1, wherein the angles of the initial polarizations are respectively 40° and 45°, and the polarization correctors respectively rotate the initial polarizations by +45° and −45° and +45°.

4. The stereoscopic image display device of claim 3, wherein the polarization correctors are a first retardation film and a second retardation film, respectively.

5. The stereoscopic image display device of claim 4, wherein the retardation films are a first $\lambda/2$ film and a second $\lambda/2$, respectively, and the first $\lambda/2$ film and the second $\lambda/2$ film are attached with optical axes thereof having been rotated by +22.5° and −22.5° or −22.5° and +22.5°, respectively.

6. The stereoscopic image display device of claim 3, wherein the half mirror is polarizing beam splitter.

7. The stereoscopic image display device of claim 6, wherein the polarizing beam splitter is a wire grid polarizer.

* * * * *